(12) United States Patent
Liu et al.

(10) Patent No.: US 9,645,686 B2
(45) Date of Patent: May 9, 2017

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN)

(73) Assignees: BOE TECHNOLOGY GROUP CO., LTD. (CN); BEIJING BOE OPTOELECTRONICS CO., LTD. (CN)

( * ) Notice: Subject to any disclaimer, the term of this patent is extended or adjusted under 35 U.S.C. 154(b) by 125 days.

(21) Appl. No.: 14/435,935

(22) PCT Filed: Mar. 27, 2014

(86) PCT No.: PCT/CN2014/074154
§ 371 (c)(1),
(2) Date: Apr. 15, 2015

(87) PCT Pub. No.: WO2015/123912
PCT Pub. Date: Aug. 27, 2015

(65) Prior Publication Data
US 2016/0026290 A1    Jan. 28, 2016

(30) Foreign Application Priority Data
Feb. 24, 2014   (CN) .......................... 2014 1 0062454

(51) Int. Cl.
*G06F 3/041*   (2006.01)
*G06F 3/044*   (2006.01)
(Continued)

(52) U.S. Cl.
CPC ............. *G06F 3/044* (2013.01); *G06F 3/047* (2013.01); *G06F 3/0412* (2013.01); *G09G 3/20* (2013.01);
(Continued)

(58) Field of Classification Search
CPC combination set(s) only.
See application file for complete search history.

(56) References Cited

U.S. PATENT DOCUMENTS

| 2010/0110040 A1 | 5/2010 | Kim et al. |
| 2012/0050219 A1 | 3/2012 | Lee et al. |

(Continued)

FOREIGN PATENT DOCUMENTS

| CN | 201607591 U | 10/2010 |
| CN | 102221755 A | 10/2011 |

(Continued)

OTHER PUBLICATIONS

Office Action in Chinese Patent Application No. 201410062461.1, dated Mar. 21, 2016.

(Continued)

*Primary Examiner* — Van Chow
(74) *Attorney, Agent, or Firm* — Brooks Kushman P.C.

(57) ABSTRACT

The present disclosure provides an in-cell touch panel and a display device. An entire common electrode layer on an array substrate is divided so as to form a plurality of touch driving sub-electrodes and a plurality of common sub-electrodes spaced apart from each other and arranged alternately. The touch driving sub-electrodes are electrically connected to each other via a touch driving signal line so as to form a touch driving electrode, and the common sub-electrodes are electrically connected to each other via a common electrode signal line to form a common electrode.

(Continued)

Touch sensing electrodes are arranged on an opposite substrate and cross the touch driving electrodes.

16 Claims, 7 Drawing Sheets

(51) Int. Cl.
  *G06F 3/047* (2006.01)
  *G09G 3/20* (2006.01)
  *G09G 3/36* (2006.01)
(52) U.S. Cl.
  CPC ..... *G06F 2203/04103* (2013.01); *G09G 3/36* (2013.01); *G09G 2300/0426* (2013.01); *G09G 2310/08* (2013.01); *G09G 2320/0233* (2013.01)

(56) References Cited

U.S. PATENT DOCUMENTS

| | | |
|---|---|---|
| 2012/0274603 A1 | 11/2012 | Kim et al. |
| 2013/0314371 A1 | 11/2013 | Lee |
| 2014/0118642 A1 | 5/2014 | Wang et al. |
| 2014/0247402 A1 | 9/2014 | Chou et al. |
| 2014/0306916 A1* | 10/2014 | Wang ............... G06F 3/041 345/173 |
| 2014/0320767 A1* | 10/2014 | Xu ............... G06F 3/0412 349/12 |
| 2015/0309630 A1* | 10/2015 | Yang ............... G02F 1/1333 345/206 |
| 2016/0026290 A1 | 1/2016 | Liu et al. |

FOREIGN PATENT DOCUMENTS

| | | |
|---|---|---|
| CN | 103049157 A | 4/2013 |
| CN | 202948433 U | 5/2013 |
| CN | 103150070 A | 6/2013 |
| CN | 103218097 A | 7/2013 |
| CN | 203178998 U | 9/2013 |
| CN | 203706178 U | 7/2014 |
| EP | 2 477 102 A2 | 7/2012 |
| TW | 201209687 A | 3/2012 |

OTHER PUBLICATIONS

Office Action in Chinese Patent Application No. 201410062461.1, dated Sep. 6, 2016.
International Search Report and Written Opinion in PCT International Application No. PCT/CN2014/074138, dated Dec. 2, 2014.
International Search Report and Written Opinion in PCT International Application No. PCT/CN2014/074154, dated Dec. 3, 2014.

* cited by examiner

IN-CELL TOUCH PANEL AND DISPLAY DEVICE

CROSS-REFERENCE TO RELATED APPLICATIONS

This application is the U.S. National Phase of International Patent Application No. PCT/CN2014/074154, filed Mar. 27, 2014 and claims priority to Chinese Patent Application No. 201410062454, filed Feb. 24, 2014, the disclosures of which are incorporated herein by reference in their entirety.

TECHNICAL FIELD

The present disclosure relates to the field of touch technology, in particular to an in-cell touch panel and a display device.

BACKGROUND

Along with the rapid development of the display technology, touch panel has been widely used in our daily lives. Currently, depending on its structure, the touch panel may include an add-on mode touch panel, an on-cell touch panel and an in-cell touch panel. For the add-on mode touch panel, the touch panel and a liquid crystal display (LCD) panel are produced separately, and then attached together so as to form the LCD panel having a touch function. However, there exist for the add-on mode touch panel such drawbacks as high manufacture cost, low light transmittance and thick module. For the in-cell touch panel, a touch electrode of the touch panel is built in the LCD panel so as to reduce a thickness of the entire module and remarkably reduce its manufacture cost, so it has attracted more and more attentions from manufacturers.

Recently, liquid crystal display technologies capable of achieving a wide viewing angle mainly include an in-plane switch (IPS) technology and an advanced super-dimension switch (ADS) technology. For the ADS technology, a multi-dimensional electric field is formed by means of electrical fields generated at edges of slit electrodes within an identical plane and an electrical field generated between a slit electrode layer and a plate electrode layer, so as to enable all the liquid crystal molecules between the slit electrodes and right above the electrodes within a liquid crystal cell to rotate, thereby to improve the operational efficiency of liquid crystal molecules and enhance the light transmission efficiency. The ADS technology may be used to improve the image quality of a TFT-LCD product, and has such advantages as high resolution, high transmittance, low power consumption, wide viewing angle, high aperture ratio, low chromatic aberration and free of push Mura. H-ADS (high aperture ratio-ADS) technology is an important part of the ADS technology For the in-cell touch panel based on the ADS technology and the H-ADS technology, a common electrode layer on the array substrate is divided into touch driving electrodes and common electrodes insulated from each other and arranged in a crisscross manner, and touch sensing electrodes are arranged on an opposite substrate at positions corresponding to regions where the common electrodes are located. The touch driving electrodes are driven in a time-division manner, so as to achieve a touch function and a display function. In the in-cell touch panel, a projection of the touch sensing electrode onto the array substrate is located at the region where the common electrode is located, and the common electrodes and the touch driving electrodes are located at an identical layer and insulated from each other. In this way, it is able to prevent the touch sensing electrode and the touch driving electrode from overlapping each other and reduce a mutual capacitance formed by the overlapping area, thereby to increase the proportion of the mutual capacitance variation when a touch is made by a finger and improve the touch accuracy.

In the in-cell touch panel, as shown in FIG. 1, which is a schematic view showing the divided common electrode layer, each common electrode 01 is a bar-like electrode, and each touch driving electrode 02 consists of a plurality of touch driving sub-electrodes 021, 022, 023, 024 arranged in an identical column. Each of the touch driving sub-electrodes 021, 022, 023 and 024 is arranged between the adjacent common electrodes 01. The touch driving sub-electrodes 021, 022, 023 and 024 belonging to the same touch driving electrode 02 and arranged at both sides of the common electrodes 01 are electrically connected to each other via a touch driving signal line 03. When it is required to achieve the display function, a common electrode signal is applied to the common electrodes 01 and the touch driving electrodes 02 simultaneously. However, because each touch driving electrode 02 consists of a plurality of separate touch driving sub-electrodes 021, 022, 023 and 024 while the common electrode 01 is a bar-like electrode, a signal transmission load of the touch driving electrode 02 is different from that of the common electrode 01, and the common electrode signal is transmitted in the common electrode 01 at a speed different from in the touch driving electrode 02. As a result, an uneven display image will occur and the image quality will be adversely affected.

SUMMARY

An object of the present disclosure is to provide an in-cell touch panel and a display device, so as to prevent the occurrence of uneven display due to different loads of a touch driving electrode and a common electrode in an existing in-cell touch panel.

The present disclosure provides in one embodiment an in-cell touch panel, including an array substrate having a common electrode layer, and an opposite substrate arranged opposite to the array substrate.

The common electrode layer of the array substrate includes a plurality of touch driving sub-electrodes and a plurality of common sub-electrodes arranged in a matrix form and spaced apart from each other. The touch driving sub-electrodes and the common sub-electrodes are arranged alternately in both a row direction and a column direction of the matrix.

A plurality of touch driving signal lines and a plurality of common electrode signal lines are arranged on the array substrate. In the row or column direction of the matrix, the touch driving sub-electrodes at both sides of the common sub-electrode are electrically connected to each other via the touch driving signal line, so as to form a touch driving electrode. In the row or column direction of the matrix, the common sub-electrodes at both sides of the touch driving sub-electrode are electrically connected to each other via the common electrode signal line, so as to form a common electrode. Within a display period of one frame, a common electrode signal and a touch scanning signal are applied to the touch driving electrodes in a time-division manner, and the common electrode signal is applied to the common electrodes.

A plurality of touch sensing electrodes are arranged on the opposite substrate and cross the touch driving electrodes, and an orthographic projection of the touch sensing electrode onto the array substrate is located at a region where the common sub-electrode is located.

According to the in-cell touch panel in the embodiment of the present disclosure, the entire common electrode layer on the array substrate is divided so as to form a plurality of touch driving sub-electrodes and a plurality of common sub-electrodes spaced apart from each other and arranged alternately. The touch driving sub-electrodes in the row or column direction are electrically connected to each other via the touch driving signal line so as to form the touch driving electrode, and the common sub-electrodes in the row or column direction are electrically connected to each other via the common electrode signal line to form the common electrode. The touch sensing electrodes are arranged on the opposite substrate and cross the touch driving electrodes, and a projection of the touch sensing electrode onto the array substrate is located at the region where the common electrode is located. The touch driving electrode is driven in a time-division manner, so as to achieve a touch function and a display function. The touch driving electrode consists of a plurality touch driving sub-electrodes and the common electrode also consists of a plurality of common sub-electrodes, so they have an approximately identical signal transmission load, and at a display stage, the common electrode signal is transmitted in the common electrode at a speed approximately identical to in the touch driving electrode. As a result, it is able to prevent the occurrence of an uneven display image, thereby to improve the image quality.

In an alternative embodiment, the touch driving signal line extends in a direction identical to, or perpendicular to, the common electrode signal line.

In an alternative embodiment, at least two adjacent touch driving electrodes are electrically connected to form a touch driving electrode set, and at least two adjacent common electrodes are electrically connected to form a common electrode set.

In an alternative embodiment, an area occupied by the common sub-electrode is greater than or equal to that occupied by the touch driving sub-electrode.

In an alternative embodiment, a black matrix on a base substrate is arranged on the opposite substrate, and the touch sensing electrodes are arranged between the base substrate and the black matrix, or on the black matrix.

In an alternative embodiment, each touch sensing electrode includes a plurality of touch sensing sub-electrodes spaced apart from and electrically connected to each other. Each touch sensing sub-electrode is of a grid structure, and an orthographic projection of the grid structure of the touch sensing sub-electrode onto the opposite substrate is located at a region where the black matrix is located.

In an alternative embodiment, the touch sensing electrode extends in the row direction of the matrix and the touch sensing sub-electrodes of the touch sensing electrode are arranged in at least two rows, or the touch sensing electrode extends in the column direction of the matrix and the touch sensing sub-electrodes of the touch sensing electrode are arranged in at least two columns. The two adjacent touch sensing sub-electrodes of the touch sensing electrode are electrically connected to each other via a grid connector, and an orthographic projection of the grid connector onto the opposite substrate is located at a region where the black matrix is located.

In an alternative embodiment, an area occupied by the touch sensing sub-electrode is less than that occupied by the common sub-electrode.

In an alternative embodiment, the touch sensing electrode extends in the row direction of the matrix and the touch sensing sub-electrodes of the touch sensing electrode are arranged in one row, or the touch sensing electrode extends in the column direction of the matrix and the touch sensing sub-electrodes of the touch sensing electrode are arranged in one column. The touch sensing sub-electrodes of the touch sensing electrode are electrically connected to each other via a touch sensing signal line, and an orthographic projection of the touch sensing signal line onto the opposite substrate is located at the region where the black matrix is arranged.

In another aspect, the present disclosure provides in one embodiment a display device including the above-mentioned in-cell touch panel.

DETAILED DESCRIPTION

Figure 1:
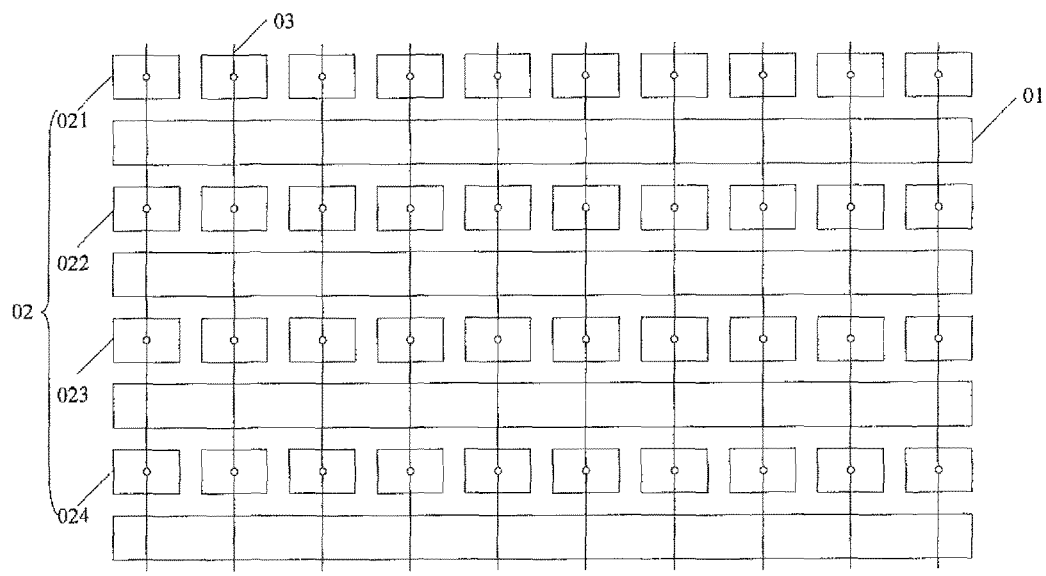
FIG. 1 is a schematic view showing a common electrode layer of an existing in-cell touch panel.

The present disclosure will be described hereinafter in conjunction with the drawings and embodiments. A thickness and a shape of each layer in the drawings are for illustrative purposes only, but shall not be used to reflect a real scale.

Figure 2:
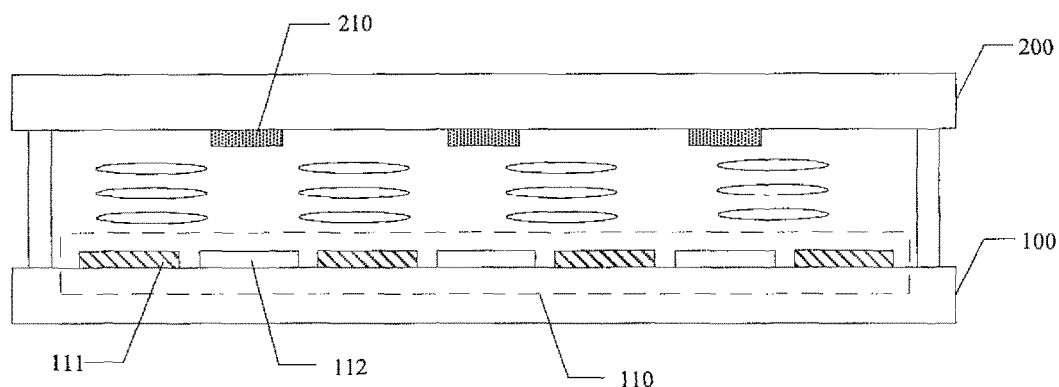
FIG. 2 is a schematic view showing an in-cell touch panel according to one embodiment of the present disclosure.

As shown in FIG. 2, which is a sectional view of an in-cell touch panel according to one embodiment of the present disclosure, the in-cell touch panel includes an array substrate 100 having a common electrode layer 110, and an opposite substrate 200 arranged opposite to the array substrate 100.

Figure 3A:
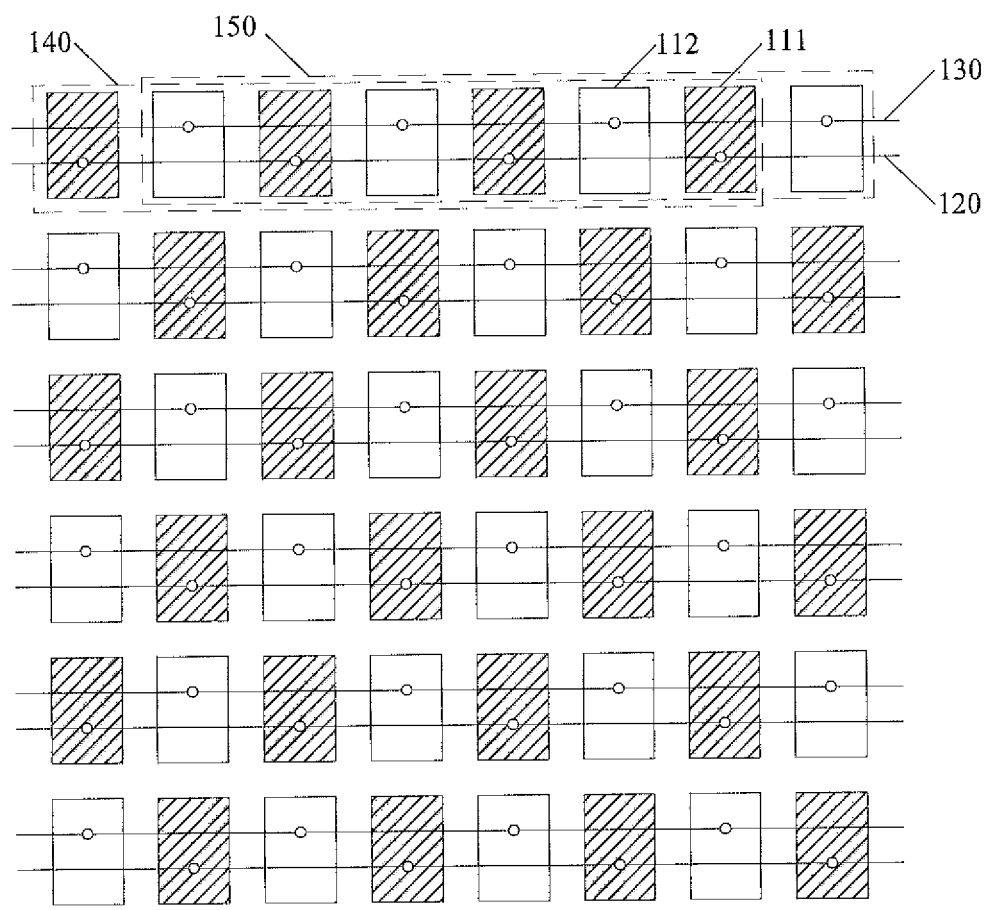
FIGS. 3*a* and 3*b* are schematic views showing an array substrate of the in-cell touch panel according to one embodiment of the present disclosure.
Figure 3B:
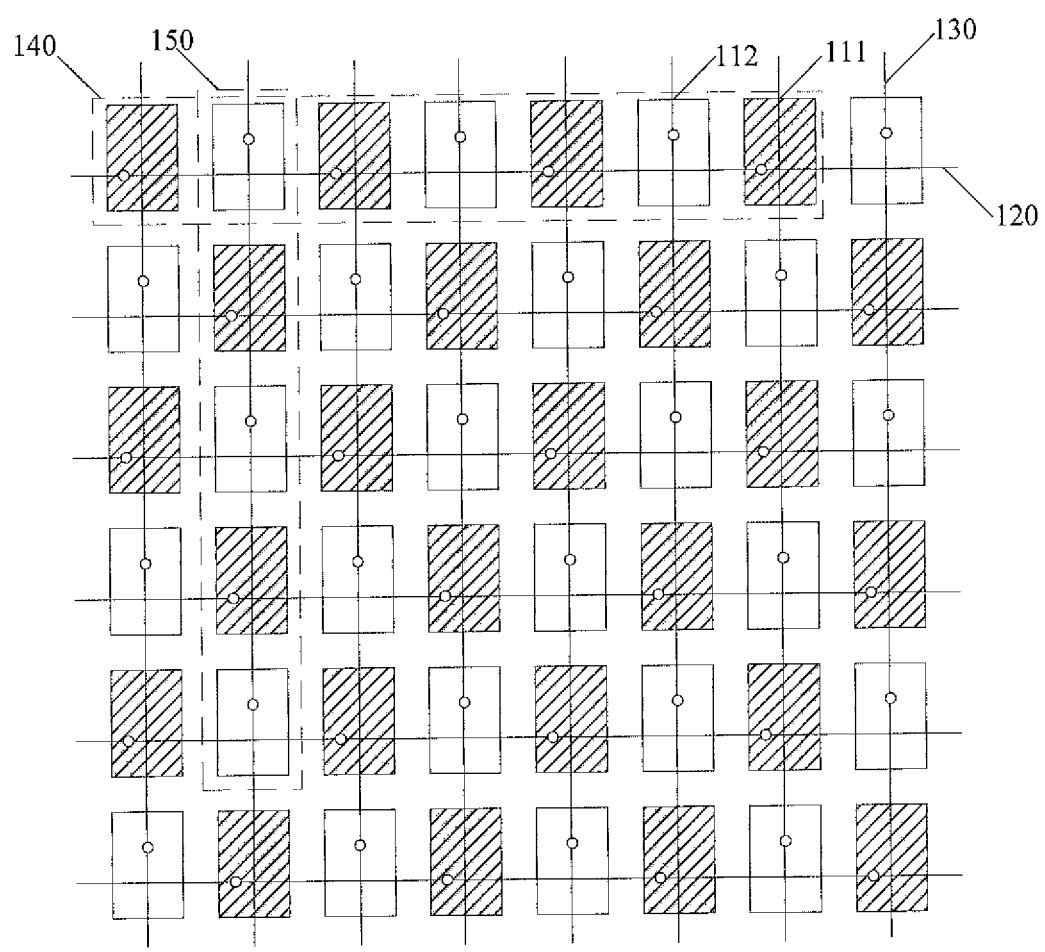

As shown in FIG. 3*a* or 3*b*, the common electrode layer 110 of the array substrate 100 includes a plurality of touch driving sub-electrodes 111 and a plurality of common sub-electrodes 112 arranged in a matrix form and spaced apart from each other. The touch driving sub-electrodes 111 and the common sub-electrodes 112 are arranged alternately in both a row direction and a column direction of the matrix.

A plurality of touch driving signal lines 120 and a plurality of common electrode signal lines 130 are arranged on the array substrate 100. In the row or column direction of the matrix, the touch driving sub-electrodes 111 at both sides of the common sub-electrode 112 are electrically connected to each other via the touch driving signal line 120, so as to form a touch driving electrode 140. In the row or column direction of the matrix, the common sub-electrodes 112 at both sides of the touch driving sub-electrode 111 are electrically connected to each other via the common electrode signal line 130, so as to form a common electrode 150. Within a display period of one frame, a common electrode signal and a touch scanning signal are applied to the touch driving electrodes 140 in a time-division manner, and the common electrode signal is applied to the common electrodes 150.

Figure 4A:
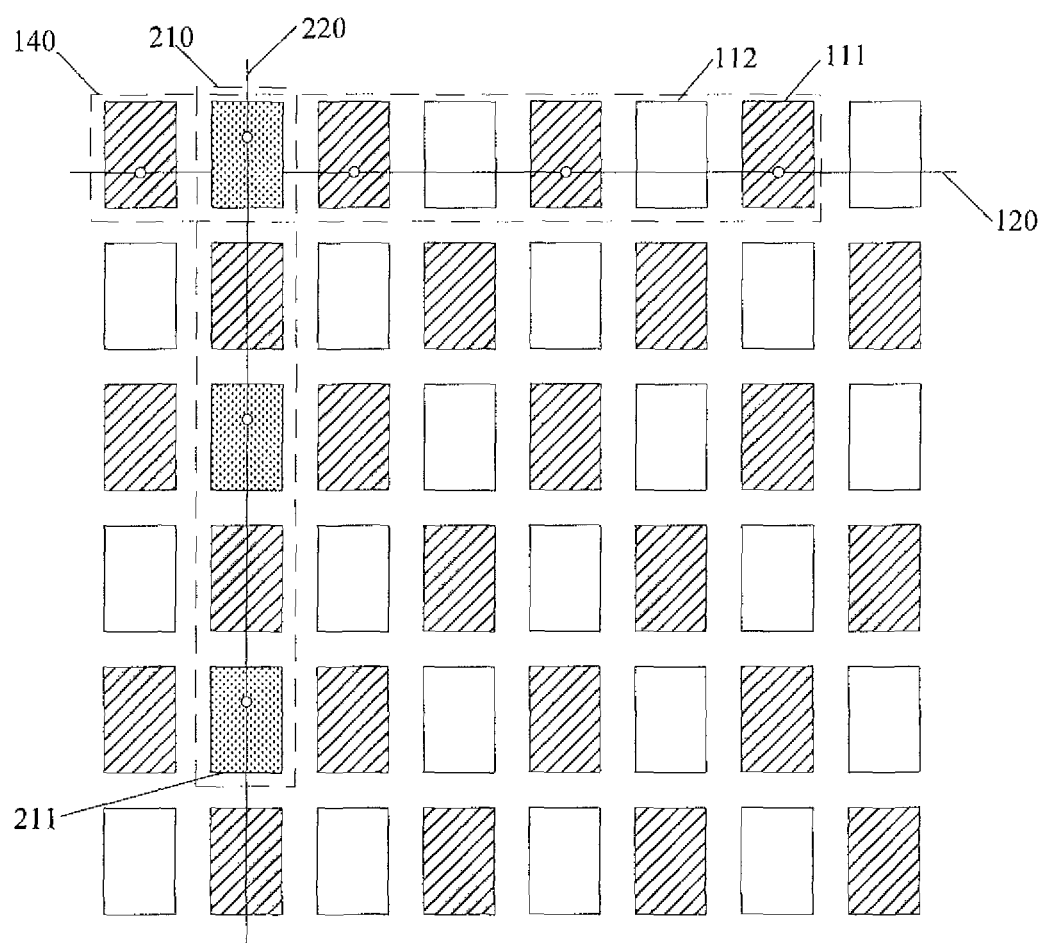
FIGS. 4*a* and 4*b* are schematic views showing the positional relationship between a touch sensing electrode and a touch driving electrode of the in-cell touch panel according to one embodiment of the present disclosure.
Figure 4B:
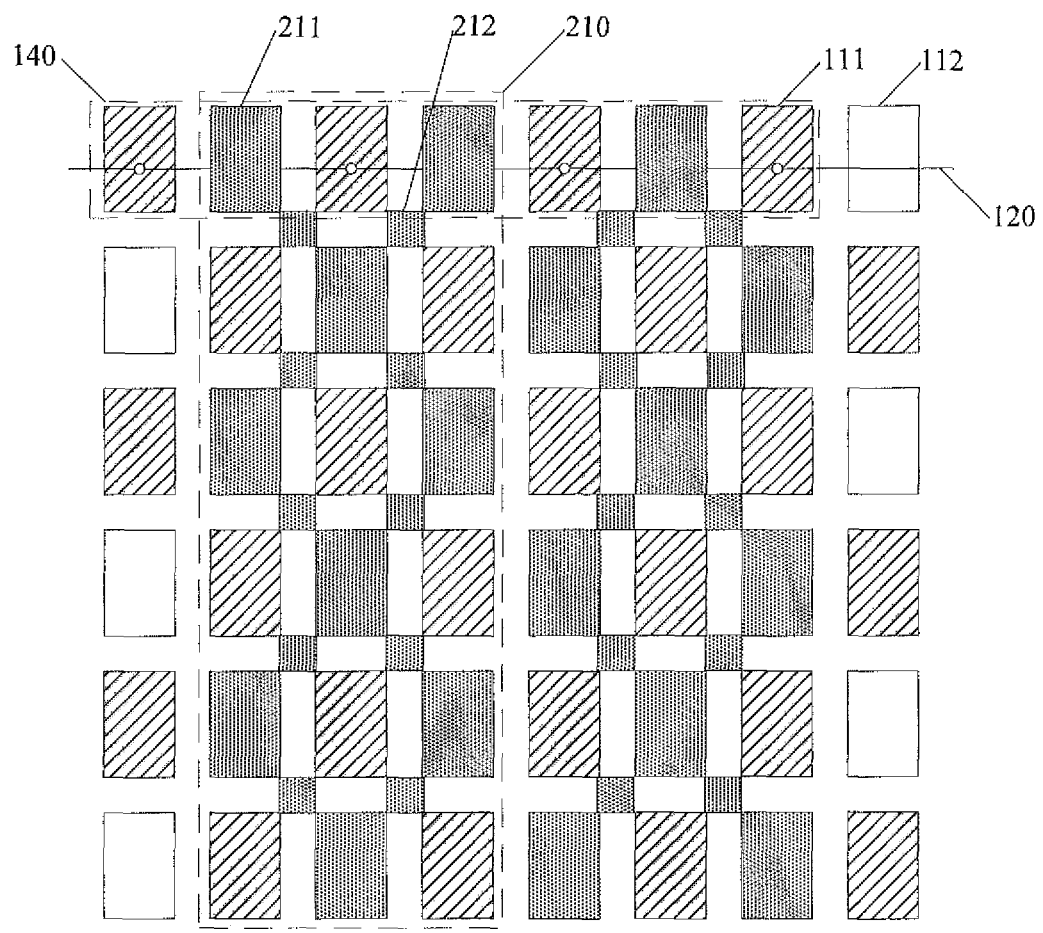

As shown in FIGS. 4a and 4b, a plurality of touch sensing electrodes 210 is arranged on the opposite substrate 200 and cross the touch driving electrodes 140, and an orthographic projection of the touch sensing electrode 210 onto the array substrate 100 is located at a region where the common sub-electrode 112 is located.

According to the in-cell touch panel in the embodiment of the present disclosure, the entire common electrode layer on the array substrate is divided so as to form a plurality of touch driving sub-electrodes and a plurality of common sub-electrodes spaced apart from each other and arranged alternately. The touch driving sub-electrodes in the row or column direction are electrically connected to each other via the touch driving signal line so as to form the touch driving electrode, and the common sub-electrodes in the row or column direction are electrically connected to each other via the common electrode signal line to form the common electrode. The touch sensing electrodes are arranged on the opposite substrate and cross the touch driving electrodes, and a projection of the touch sensing electrode onto the array substrate is located at the region where the common electrode is located. The touch driving electrode is driven in a time-division manner, so as to achieve a touch function and a display function. The touch driving electrode consists of a plurality touch driving sub-electrodes and the common electrode also consists of a plurality of common sub-electrodes, so they have an approximately identical signal transmission load, and at a display stage, the common electrode signal is transmitted in the common electrode at a speed approximately identical to in the touch driving electrode. As a result, it is able to prevent the occurrence of an uneven display image, thereby to improve the image quality.

In addition, according to the in-cell touch panel in the embodiment of the present disclosure, the in-cell touch panel is driven at a touch stage and a display stage in a time-division manner. As a result, it is able to, on one hand, reduce the production cost by integrating a display driving chip and a touch driving chip together, and on the other hand, reduce the mutual interference between the display stage and the touch stage as well as improve the image quality and the touch accuracy.

Figure 5:
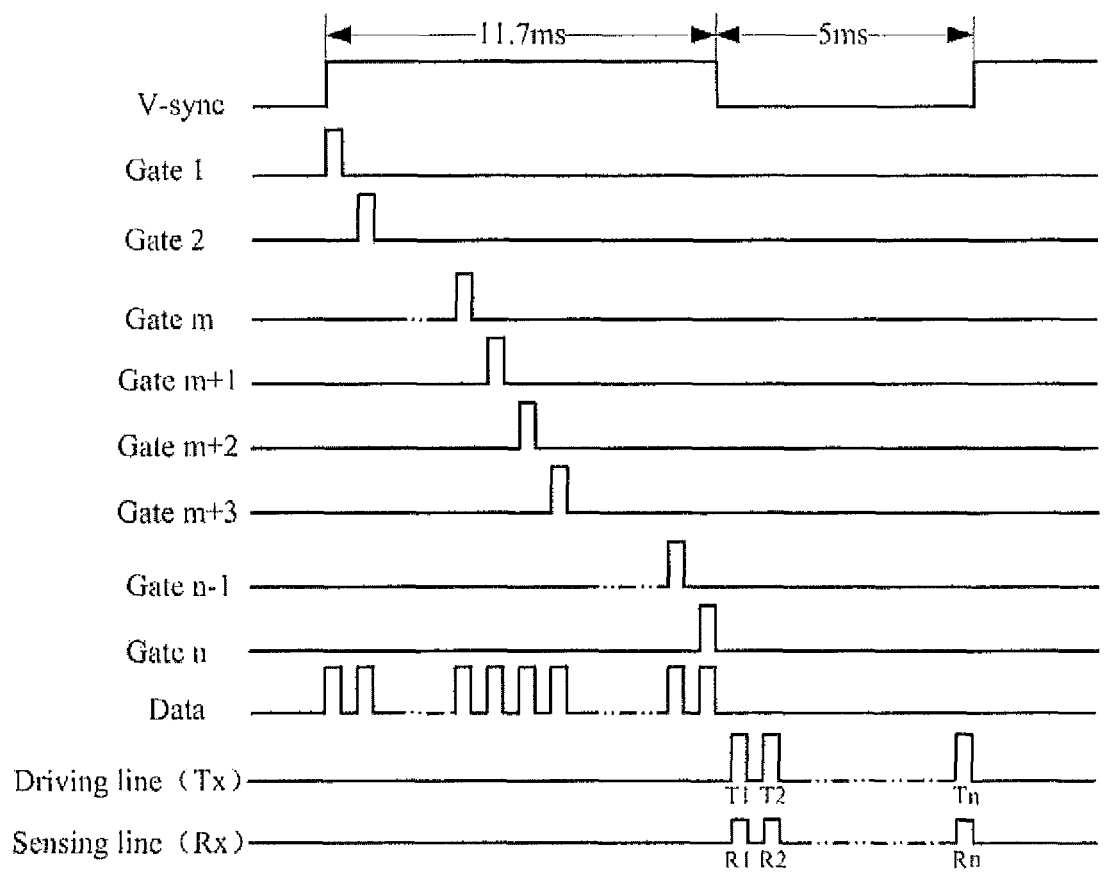
FIG. 5 is a driving sequence diagram of the in-cell touch panel according to one embodiment of the present disclosure.

To be specific, in a driving sequence diagram as shown in FIG. 5, a period, e.g., 16.7 ms, for displaying each frame (V-sync) on the in-cell touch panel is divided into a display period (Display), e.g., 11.7 ms, and a touch period (Touch), e.g., 5 ms. Of course, the durations of the display period and the touch period may be adjusted appropriately in accordance with a processing capacity of an IC, and they are not particularly defined herein. At the display period, a gate scanning signal is applied to gate signal lines Gate 1, Gate 2, . . . , Gate n of the in-cell touch panel in turn, and a grayscale signal is applied to data signal lines Data. At this time, the touch driving electrode TX serves as the common electrode, and a constant common electrode signal is applied to the touch driving electrode Tx via the IC connected to the touch driving electrode Tx, so as to achieve the display function. At the touch period, touch scanning signals T1, T2, . . . , Tn are applied to the touch driving electrodes via the IC connected to the touch driving electrodes, and touch sensing signals R1, R2, . . . , Rn are detected by the touch sensing electrodes, respectively, so as to achieve the touch function. There is no signal applied to each gate signal line and each data signal line of the in-cell touch panel at the touch period, and the common electrode signal is always applied to the common electrodes at both the display period and the touch period. Alternatively, the common electrode signal is applied to the common electrodes at the display period, while the common electrodes are grounded or floating (i.e., no signal is applied) at the touch period.

During the implementation, the touch driving electrode 140 may extend in the row direction of the matrix, and the touch sensing electrode 210 may extend in the column direction of the matrix. Of course, the wiring directions may be changed in accordance with a size of a device, i.e., the touch driving electrode 140 may extend in the column direction of the matrix, and the touch sensing electrode 210 extend in the row direction of the matrix.

The following description is given when the touch driving electrode 140 extends in the column direction of the matrix while the touch sensing electrode 210 extends in the row direction of the matrix. During the implementation, a wiring direction of the common electrode 150 may be identical to that of the touch driving electrode 140, or that of the touch sensing electrode 210.

When the wiring direction of the common electrode 150 is identical to that of the touch driving electrode 140, as shown in FIG. 3a, the touch driving signal line 120 connecting the touch driving sub-electrodes 111 extends in a direction identical to that of the common electrode signal line 130 connecting the common sub-electrodes 112. When the wiring direction of the common electrode 150 is identical to that of the touch sensing electrode 210, as shown in FIG. 3b, the touch driving signal line 120 connecting the touch driving sub-electrodes 111 extends in a direction perpendicular to the common electrode signal line 130 connecting the common sub-electrodes 112.

When the touch driving signal line 120 extends in a direction identical to the common electrode signal line 130, the number of the touch driving sub-electrodes 111 of the touch driving electrode 140 is identical to the number of the common sub-electrodes 112 of the common electrode 150. At this time, the signal transmission load of the touch driving electrode 140 is approximately identical to that of the common electrode 150, and at the display stage, the common electrode signal is transmitted in the common electrode 150 at a speed approximately identical to in the touch driving electrode 140. As a result, it is able to prevent the occurrence of an uneven display image, thereby to improve the image quality.

When the touch driving signal line 120 extends in a direction identical to the common electrode signal line 130, the touch driving signal line 120 and the common electrode signal line 130 may be arranged at a layer identical to the gate signal line of the array substrate. The touch driving signal line 120 is electrically connected to the corresponding touch driving sub-electrode 111 through at least one via-hole, and the common electrode signal line 130 is electrically connected to the corresponding common sub-electrode 112 through at least one via-hole. In this way, it is merely required to, without any additional process, form patterns of the touch driving signal lines 120, the common electrode signal lines 130 and the gate signal lines by a single patterning process. As a result, it is able to reduce the production cost and increase an added value of the product.

Further, the common electrode layer is usually made of ITO which has a relatively high resistance. After the touch driving signal line 120 made of metal is electrically connected to the touch driving electrode 140, it is equivalent to that the ITO electrode is connected in parallel to resistors formed by the touch driving signal lines 120. In this way, it is able to minimize the resistance of the touch driving electrode 140, thereby to improve a signal-to-noise ratio when the signal is transmitted by the electrodes. Identically, after the common electrode line 130 made of metal is electrically connected to the common electrode 150, it is equivalent to that the ITO electrode is connected in parallel to resistors formed by the common electrode signal lines 130. In this way, it is able to minimize the resistance of the common electrode 150, thereby to improve a signal-to-noise ratio when the signal is transmitted by the electrodes.

Further, in order to improve a display effect at a display stage in a more effective manner and prevent the occurrence of an uneven display image due to different signal transmission rates of the common electrode signal in the touch driving electrode and the common electrode, during the implementation, at least two (e.g., three) adjacent touch driving electrodes 140 are electrically connected to each other to form a touch driving electrode set, and at least two (e.g., three) adjacent common electrodes 150 are electrically connected to each other to form a common electrode set. In this way, the common sub-electrodes 112 of the common electrode set and the touch driving sub-electrodes 111 of the touch driving electrode set are arranged in a mixed manner, and the uneven image due to signal delay is not so obvious when the common electrode signal is applied to the common electrode and the touch driving electrode simultaneously.

Further, in order to divide the common electrode layer 110 conveniently, the common sub-electrode 112 may be of a shape, usually a quadrilateral shape as shown in FIGS. 3a and 3b, identical to the touch driving sub-electrode 111. Of course, the electrodes may also be of any other shapes in accordance with the practical need, which are not particularly defined herein.

During the implementation, an area occupied by the common sub-electrodes 112 may be greater than or equal to that occupied by the touch driving sub-electrodes 111. When the area occupied by the common sub-electrodes 112 is slightly greater than that occupied by the touch driving sub-electrodes 111, a size of a region occupied by the touch sensing electrode 210, whose orthographic projection is located at a region where the common sub-electrode 112 is located, may be set as slightly smaller than that of the region where the common sub-electrode 112 is located. In this way, there is a certain gap between the orthographic projection of the touch sensing electrode 210 and the orthographic projection of the touch driving sub-electrode 111 onto the array substrate. As a result, it is able to effectively increase edge capacitance between the touch driving electrode 140 and the touch sensing electrode 210, thereby to reduce a proportion of an overlapping capacitance therebetween and improve the touch sensitivity.

During the implementation, usually a black matrix on a base substrate may be arranged on the opposite substrate 200. The touch sensing electrode 210 may be arranged between the base substrate and the black matrix, or on the black matrix, which is not particularly defined herein.

In addition, the orthographic projection of the touch sensing electrode 210 onto the array substrate 100 is located at the region where the common sub-electrode 112 is located, and the touch driving sub-electrodes 111 and the common sub-electrodes 112 are arranged alternately. Hence, as shown in FIGS. 4a and 4b which show the orthographic projection of the touch sensing electrode 210 onto the array substrate 100, the touch sensing electrode 210 also consists of a plurality of touch sensing sub-electrodes 211 spaced apart from and electrically connected to each other, and the common sub-electrodes 112 are shielded by the touch sensing sub-electrodes 211 of the touch sensing electrode 210. Moreover, in order to ensure that an aperture ratio of a pixel unit is not affected by the touch sensing sub-electrodes 211, usually the touch sensing sub-electrode 211 is of a grid structure, and an orthographic projection of the touch sensing sub-electrode 211 onto the opposite array substrate 200 is located at a region where the black matrix is located. In this way, the grid structure of the touch sensing sub-electrode 211 may be shielded by the black matrix, so as not to affect the aperture ratio or the light transmittance of the display device. To be specific, a mesh size of the grid structure of the touch sensing sub-electrode 211 may be set in accordance with the practical need. For example, a pattern of the touch sensing sub-electrode 211 may be arranged at a gap between subpixel units (RGB) of the pixel unit, or the pattern may be merely arranged at a gap between the pixel units.

To be specific, the pixel unit is not shielded by the touch sensing sub-electrode 211 with the grid structure on the opposite substrate 200, so the touch sensing electrode 210 may be made of a transparent conductive oxide, e.g., ITO or IZO, or metal. When the touch sensing electrode 210 is made of metal, it is able to reduce its resistance effectively.

During the implementation, a width of the touch sensing electrode may be set in accordance with a width of the touch driving electrode. To be specific, when the touch sensing electrode 210 extends in the row direction of the matrix and the touch sensing sub-electrodes 211 of the touch sensing electrode 210 are arranged in one row, or as shown in FIG. 4a, when the touch sensing electrode 210 extends in the column direction of the matrix and the touch sensing sub-electrodes 211 of the touch sensing electrode 210 are arranged in one column, the touch sensing sub-electrodes 211 of the touch sensing electrode 210 may be electrically connected to each other via the touch sensing signal line 220, and an orthographic projection of the touch sensing signal line 220 onto the opposite substrate 200 is located at the region where the black matrix is located.

When at least two adjacent touch driving electrodes 140 are electrically connected to form a touch driving electrode set, usually the touch sensing electrode 210 consists of several rows or columns of touch sensing sub-electrodes 211, and the touch driving sub-electrodes 211 may be connected via a grid connector 212, i.e., a metallic grid. As a result, it is able to omit the touch sensing signal line.

Figure 4C:
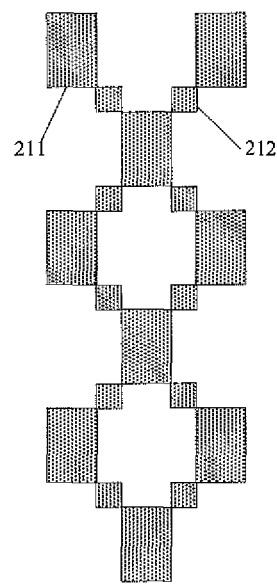
FIG. 4*c* is a schematic view showing the touch sensing electrode of the in-cell touch panel according to one embodiment of the present disclosure.
Figure 4D:
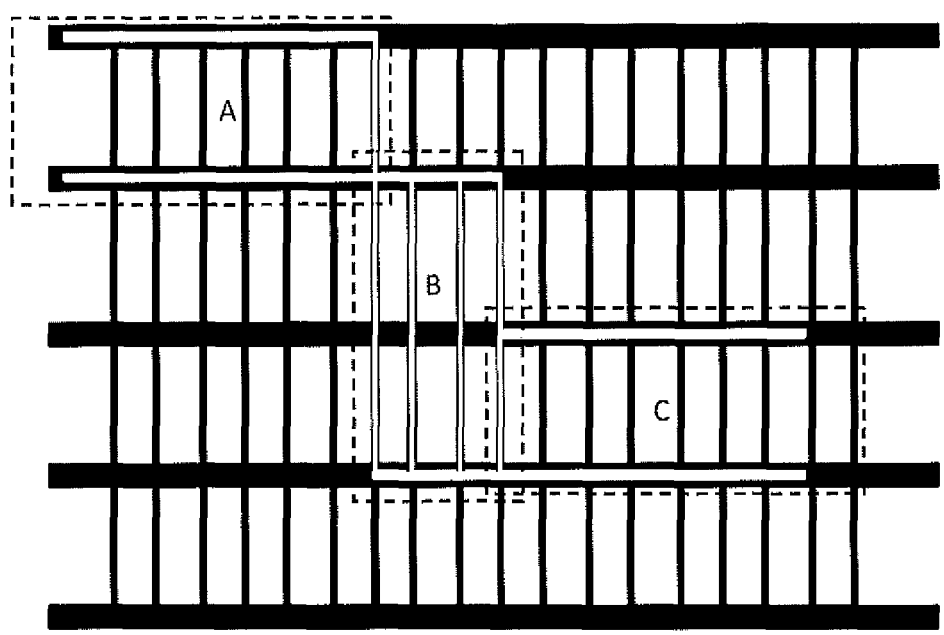
FIG. 4*d* is a schematic view showing a part of the touch sensing electrode of the in-cell touch panel according to one embodiment of the present disclosure.

To be specific, when the touch sensing electrode extends in the row direction of the matrix and the touch sensing sub-electrodes of the touch sensing electrode are arranged in at least two rows, or as shown in FIG. 4b, when the touch sensing electrode extends in the column direction of the matrix and the touch sensing sub-electrodes of the touch sensing electrode are arranged in at least two columns, the two adjacent touch sensing sub-electrodes 211 of the touch sensing electrode 210 are electrically connected to each other via the grid connector 212, and FIG. 4c show the touch sensing electrode 210. In addition, in order to prevent the aperture ratio of the display device from being adversely affected, an orthographic projection of the grid connector 212 onto the opposite substrate 200 is also located at the region where the black matrix is located. As shown in FIG. 4d, the touch sensing sub-electrodes 211 are located at regions A and C, the grid connector 212 is located at region B, and a pattern of the black matrix is located at a black region.

Further, during the implementation, the area of the region occupied by the touch sensing sub-electrodes 211 may be set as smaller than that occupied by the common sub-electrodes 112. In this way, it is able to, on one hand, arrange the grid connector 212 at a region corresponding to the common sub-electrode 112 and prevent the occurrence of an overlapping capacitance between the grid connector 212 and the touch driving electrode 140 as possible, thereby to prevent the touch accuracy from being adversely affected. On the other hand, there may exist a certain gap between the orthographic projections of the touch sensing electrode 210 and the touch driving sub-electrode 111 onto the array substrate, so it is able to effectively increase the edge capacitance between the touch driving electrode 140 and the touch sensing electrode 210, thereby to reduce the proportion of the overlapping capacitance therebetween and improve the touch sensitivity.

Based on the same inventive concept, the present disclosure further provides in one embodiment a display device including the above-mentioned in-cell touch panel. The display device may be any product or member having a display function, e.g., a mobile phone, a flat-panel PC, a TV, a display, a laptop PC, a digital photo frame and a navigator. The implementation of the display device may refer to the above embodiments, and thus will not be repeated herein.

According to the in-cell touch panel and the display device in the embodiments of the present disclosure, the entire common electrode layer on the array substrate is divided so as to form a plurality of touch driving sub-electrodes and a plurality of common sub-electrodes spaced apart from each other and arranged alternately. The touch driving sub-electrodes in the row or column direction are electrically connected to each other via the touch driving signal line so as to form the touch driving electrode, and the common sub-electrodes in the row or column direction are electrically connected to each other via the common electrode signal line to form the common electrode. The touch sensing electrodes are arranged on the opposite substrate and cross the touch driving electrodes, and a projection of the touch sensing electrode onto the array substrate is located at the region where the common electrode is located. The touch driving electrode is driven in a time-division manner, so as to achieve a touch function and a display function. The touch driving electrode consists of a plurality touch driving sub-electrodes and the common electrode also consists of a plurality of common sub-electrodes, so they have an approximately identical signal transmission load, and at a display stage, the common electrode signal is transmitted in the common electrode at a speed approximately identical to in the touch driving electrode. As a result, it is able to prevent the occurrence of an uneven display image, thereby to improve the image quality.

The above are merely the preferred embodiments of the present disclosure. Obviously, a person skilled in the art may make further modifications and improvements without departing from the spirit of the present disclosure. If these modifications and improvements fall within the scope of the appended claims and the equivalents thereof, the present disclosure also intends to include them.

What is claimed is:

1. An in-cell touch panel, comprising an array substrate having a common electrode layer, and an opposite substrate arranged opposite to the array substrate, wherein the common electrode Layer of the array substrate comprises a plurality of touch driving sub-electrodes and a plurality of common sub-electrodes arranged in a matrix form and spaced apart from each other, and the touch driving sub-electrodes and the common sub-electrodes are arranged alternately in both a row direction and a column direction of the matrix;
a plurality of touch driving signal lines and a plurality of common electrode signal lines are arranged on the array substrate, in the row or column direction of the matrix, the touch driving sub-electrodes at both sides of the common sub-electrode are electrically connected to each other via the touch driving signal line, so as to form a touch driving electrode, and in the row or column direction of the matrix, the common sub-electrodes at both sides of the touch driving sub-electrode are electrically connected to each other via the common electrode signal line, so as to form a common electrode;
a plurality of touch sensing electrodes are arranged on the opposite substrate and cross the touch driving electrodes, and an orthographic projection of the touch sensing electrode onto the array substrate is located at a region where the common sub-electrode is located,
a black matrix on a base substrate is arranged on the opposite substrate, and the touch sensing electrodes are arranged between the base substrate and the black matrix, or on the black matrix,
each touch sensing electrode comprises a plurality of touch sensing sub-electrodes spaced apart from and electrically connected to each other, each touch sensing sub-electrode is of a grid structure, and an orthographic projection of the grid structure of the touch sensing sub-electrode onto the opposite substrate is located at a region where the black matrix is located.

2. The in-cell touch panel according to claim 1, wherein the touch driving signal line extends in a direction Identical to, or perpendicular to, the common electrode signal line.

3. The in-cell touch panel according to claim 2, wherein at least two adjacent touch driving electrodes are electrically connected to form a touch driving electrode set, and at least two adjacent common electrodes are electrically connected to form a common electrode set.

4. The in-cell touch panel according to claim 1, wherein at least two adjacent touch driving electrodes are electrically connected to form a touch driving electrode set, and at least two adjacent common electrodes are electrically connected to form a common electrode set.

5. The in-cell touch panel according to claim 1, wherein an area occupied by the common sub-electrode is greater than or equal to that occupied by the touch driving sub-electrode.

6. The in-cell touch panel according to claim 1, wherein the touch sensing electrode extends in the row direction of the matrix and the touch sensing sub-electrodes of the touch sensing electrode are arranged in at least two rows, or the touch sensing electrode extends in the column direction of the matrix and the touch sensing sub-electrodes of the touch sensing electrode are arranged in at least two columns, and
the two adjacent touch sensing sub-electrodes of the touch sensing electrode are electrically connected to each other via a grid connector, and an orthographic projection of the grid connector onto the opposite substrate is located at a region where the black matrix is located.

7. The in-cell touch panel according to claim 6, wherein an area occupied by the touch sensing sub-electrode is less than that occupied by the common sub-electrode.

8. The in-cell touch panel according to claim 1, wherein the touch sensing electrode extends in the row direction of the matrix and the touch sensing sub-electrodes of the touch sensing electrode are arranged in one row, or the touch sensing electrode extends in the column direction of the matrix and the touch sensing sub-electrodes of the touch sensing electrode are arranged in one column, and the touch sensing sub-electrodes of the touch sensing electrode are electrically connected to each other via a touch sensing signal line, and an orthographic projection of the touch sensing signal line onto the opposite substrate is located at the region where the black matrix is arranged.

9. The in-cell touch panel according to claim 2, wherein an area occupied by the common sub-electrode is greater than or equal to that occupied by the touch driving sub-electrode.

10. A display device comprising an in-cell touch panel, the in-cell touch panel comprising an array substrate having a common electrode layer, and an opposite substrate arranged opposite to the array substrate, wherein the common electrode layer of the array substrate comprises a plurality of touch driving sub-electrodes and a plurality of common sub-electrodes arranged in a matrix form and spaced apart from each other, and the touch driving sub-electrodes and the common sub-electrodes are arranged alternately in both a row direction and a column direction of the matrix;

a plurality of touch driving signal lines and a plurality of common electrode signal lines are arranged on the array substrate, in the row or column direction of the matrix, the touch driving sub-electrodes at both sides of the common sub-electrode are electrically connected to each other via the touch driving signal line, so as to form a touch driving electrode, and in the row or column direction of the matrix, the common sub-electrodes at both sides of the touch driving sub-electrode are electrically connected to each other via the common electrode signal line, so as to form a common electrode;

a plurality of touch sensing electrodes are arranged on the opposite substrate and cross the touch driving electrodes, and an orthographic projection of the touch sensing electrode onto the array substrate is located at a region where the common sub-electrode is located, a black matrix on a base substrate is arranged on the opposite substrate, and the touch sensing electrodes are arranged between the base substrate and the black matrix, or on the black matrix, each touch sensing electrode comprises a plurality of touch sensing sub-electrodes spaced apart from and electrically connected to each other, each touch sensing sub-electrode is of a grid structure, and an orthographic projection of the grid structure of the touch sensing sub-electrode onto the opposite substrate is located at a region where the black matrix is located.

11. The display device according to claim 10, wherein the touch driving signal line extends in a direction identical to, or perpendicular to, the common electrode signal line.

12. The display device according to claim 10, wherein at least two adjacent touch driving electrodes are electrically connected to form a touch driving electrode set, and at least two adjacent common electrodes are electrically connected to form a common electrode set.

13. The display device according to claim 10, wherein an area occupied by the common sub-electrode is greater than or equal to that occupied by the touch driving sub-electrode.

14. The display device according to claim 10, wherein the touch sensing electrode extends in the row direction of the matrix and the touch sensing sub-electrodes of the touch sensing electrode are arranged in at least two rows, or the touch sensing electrode extends in the column direction of the matrix and the touch sensing sub-electrodes of the touch sensing electrode are arranged in at least two columns, and the two adjacent touch sensing sub-electrodes of the touch sensing electrode are electrically connected to each other via a grid connector, and an orthographic projection of the grid connector onto the opposite substrate is located at a region where the black matrix is located.

15. The display device according to claim 14, wherein an area occupied by the touch sensing sub-electrode is less than that occupied by the common sub-electrode.

16. The display device according to claim 10, wherein the touch sensing electrode extends in the row direction of the matrix and the touch sensing sub-electrodes of the touch sensing electrode are arranged in one row, or the touch sensing electrode extends in the column direction of the matrix and the touch sensing sub-electrodes of the touch sensing electrode are arranged in one column, and the touch sensing sub-electrodes of the touch sensing electrode are electrically connected to each other via a touch sensing signal line, and an orthographic projection of the touch sensing signal line onto the opposite substrate is located at the region where the black matrix is arranged.

* * * * *

UNITED STATES PATENT AND TRADEMARK OFFICE
CERTIFICATE OF CORRECTION

PATENT NO. : 9,645,686 B2
APPLICATION NO. : 14/435935
DATED : May 9, 2017
INVENTOR(S) : Yingming Liu et al.

It is certified that error appears in the above-identified patent and that said Letters Patent is hereby corrected as shown below:

In the Claims

Column 10, Line 1, Claim 1:
After "the common electrode"
Delete "Layer" and
Insert -- layer --.

Column 10, Line 37, Claim 2:
After "extends in a direction"
Delete "Identical" and
Insert -- identical --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*